United States Patent Office
3,032,557
Patented May 1, 1962

3,032,557
NEW 4-HYDROXYCOUMARIN DERIVATIVES AND PROCESSES FOR THE PREPARATION THEREOF
Darius Molho, Gagny, France, assignor to Lipha Lyonnaise Industrielle Pharmaceutique, Lyon (Rhone), France
No Drawing. Filed July 27, 1959, Ser. No. 829,490
Claims priority, application France Aug. 18, 1958
14 Claims. (Cl. 260—343.2)

The present invention relates to a new series of 4-hydroxycoumarin derivatives endowed with important anti-coagulant activity and thus suitable for use notably as medicaments and rodenticides. It also concerns processes for the preparation of these derivatives.

Organic compounds endowed with anti-coagulant and rodenticidal properties are already known, more especially 2-arylindane 1-3-diones, of which the preparation and the use have formed the subject of French Patent No. 1,-085,097 of June 18, 1953. 3-3'-methylene-bis-4-hydroxycoumarin or dicoumarol, which is a natural product present in decayed melilot, is also known to possess the same properties. Compounds have been prepared by synthesis which also possess a 4-hydroxycoumarin nucleus substituted in the 3-position and have the same properties. Thus, 3-(2-benzoyl)-ethyl-4-hydroxycoumarin, which has interesting anti-coagulant activity (thesis of D. Molho, Lyon, November 1953) has already been obtained by condensation of 3-bromomethyl-4-acetoxycoumarin with ethyl benzoyl acetate in the presence of sodium ethylate or potassium tertbutylate. The initial 3-bromomethyl-4-acetoxycoumarin was prepared by acetylation, followed by bromination of 3-methyl-4-hydroxycoumarin.

In addition, there has been described in U.S. patent specification No. 2,789,986 of April 23, 1957, the preparation of 3-(2-benzoyl)-ethyl-4-hydroxycoumarin and of 3-(2-o-hydroxybenzoyl)-ethyl-4-hydroxycoumarin by condensation of a Mannich base in the 3-position of 4-hydroxycoumarin with acetophenone or o-hydroxyacetophenone. However, this process sometimes gives low yields, the main product of the reaction being the aforesaid dicoumarol.

The present invention relates to a series of derivatives similar to 3-(2-benzoyl)-ethyl-4-hydroxycoumarin which exhibit a high anti-coagulant activity. These derivatives conform to the general formula:

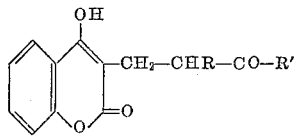

in which R represents hydrogen or the methyl group, and R' represents a phenyl group substituted by at least one of the alkyl, aryl, hydroxyalkyl, nitro or halogen radicals, or a β-naphthyl group.

If the side chain is given the enolic form

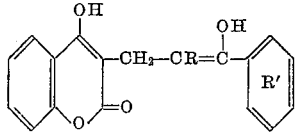

a close relationship in structure to dicoumarol of the formula

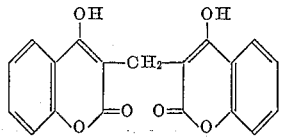

is observed. The above-defined substances have proved extremely active as anti-coagulants both in the rabbit and in the rat.

The anti-coagulant activity of the compounds of the invention has been tested by experiments carried out on a series of homogenetic rabbits of a weight between 3 kg. and 3.5 kg. It was determined by Quick's method, which is based upon the measurement of the minimum time of coagulation of the recalcified blood to which thromboplastin has been added. It is found that, 24 or 36 hours after the administration to the rabbits by the oral route of the compounds of the invention in 1 lot, the time of coagulation, which is from 7 to 8 seconds in the case of untreated control rabbits, is lengthened. There are indicated in the following table the dosages of the various compounds of the invention, and by way of comparison of 2-phenyl-indane-1:3-dione and of 3-(2-benzoyl)-ethyl-4-hydroxycoumarin (which are known compounds) which double the Quick time (from 15 to 16 seconds). These dosages are expressed in mg./kg. of weight of the animal.

| Compound: | Necessary dosage, mg./kg. |
|---|---|
| 2-phenyl-indane-1:3-dione | 100 |
| 3-(2-benzoyl)-ethyl-4-hydroxycoumarin | 60–80 |
| 3-(3,4-dimethoxy-2-benzoyl)-ethyl-4-hydroxycoumarin | 50 |
| 3-(2-p-phenylbenzoyl)-ethyl-4-hydroxycoumarin | 30 |
| 3-(2-p-chlorobenzoyl)-ethyl-4-hydroxycoumarin | 10 |
| 3-(2-p-bromobenzoyl)-ethyl-4-hydroxycoumarin | 5 |

With all these products, the return to normal coagulating times takes place 48 or 72 hours after the administration. However, it is possible by repeated administrations of smaller dosages to maintain the Quick time at the higher value obtained. For example, a daily administration of a small dosage (less than 2 mg./kg.) of 3-(2-p-bromobenzoyl)-ethyl-4-hydroxycoumarin is sufficient to maintain the Quick time at the value previously obtained.

The tested compound derivatives possess anti-vitamin-K activity, because of the lengthened time of coagulaton may be restored to the normal value by administration of vitamin $K_1$.

The above derivatives, administered to harmful rodents in mixture with food in the form of poisoned bait, bring about their death by internal hemorrhage within a short time.

It has been discovered that these various derivatives can be prepared by an entirely novel method, which is characterised in that 4-hydroxycoumarin is condensed with a Mannich base of an arylmethyl ketone, in accordance with the following reaction diagram

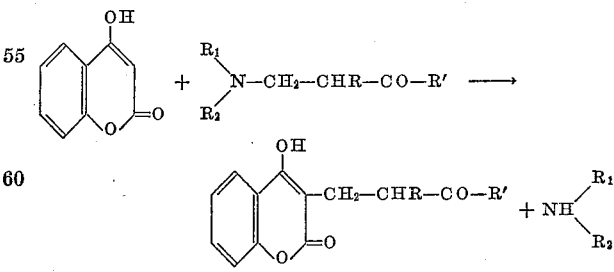

$R_1$ and $R_2$ either being independent groups or being attached by a cycle, such as the piperidine cycle.

The condensation is effected either by simple heating or in the presence of an alkali alcoholate, such as sodium ethylate, or better still within an organic base such as pyridine. A little dicoumarol may be formed as by-product. The latter separates readily by reason of its almost complete insolubility in alcohol.

The starting product, 4-hydroxycoumarin, is obtained by one of the following methods:

(a) Anschütz's reaction (Ber. 36, 465, 1903): acetylsalicylyl chloride condensed with sodium ethylmalonate in ether gives 3-carbethoxy-4-hydroxycoumarin, which is saponified and then decarboxylated;

(b) Pauly and Lockemann's reaction (Ber. 1915, 48, 28): ethylacetylsalicylate treated with sodium gives 4-hydroxycoumarin;

(c) Boyd, Robertson and Whalley's reaction (J. Chem. Soc. 1948, 174): o-oxyacetophenone is condensed with ethylcarbonate in the presence of sodium.

The Mannich bases can be prepared by the methods indicated in Blicke, Organic Reactions, I, ch. 10 (1942).

There has also been found an improvement in the method of preparation already known in principle and applied, as hereinbefore stated, to the production of 3-(2-benzoyl)-ethyl-4-hydroxycoumarin, by condensation of 3-bromomethyl-4-acetoxycoumarin with ethyl aroyl acetate. Instead of effecting the reaction in the presence of sodium ethylate or potassium tert.-butylate, it is sufficient to operate in an organic base, such as pyridine, which is simpler on the industrial scale.

The compounds of the above series may finally be prepared by a method analogous to that of U.S. patent specification No. 2,789,986, which consists in condensing a Mannich base of 3-aminomethyl-4-hydroxycoumarin in which the amino group is, for example, that of a dialkylamine or of piperidine, with an aromatic ketone possessing at least one hydrogen atom in the alpha-position in relation to the carbonyl group, preferably by heating at about 170° C. for several minutes.

The methods of preparation according to the invention and the melting points of various compounds are hereinafter given by way of example.

*Example 1.—3-(2-Benzoyl)-Ethyl-4-Hydroxycoumarin $C_{18}H_{14}O_4$*

This compound is already known; it corresponds to the case where the group R'=$C_6H_5$.

(a) 0.01 mol of β-piperidinopropiophenone hydrochloride and 0.01 mol of 4-hydroxycoumarin are mixed. The mixture is heated at 150° C. for 15 minutes on the metal bath. On cooling, 10% sodium hydroxide and ether are added and the mixture is agitated and decanted. The alkaline solution is acidified. A solid forms which is recrystallised from methanol. Melting point=152° C. Yield about 50%.

(b) 2.5 g. of ethylbenzoyl acetate and 1.5 g. of 3-bromomethyl-4-acetoxycoumarin are heated for 2 hours at 130° C. in 15 cc. of pyridine. A 5% sodium hydroxide solution is then added to decompose the excess of ethylbenzoyl acetate, and ether is added. The product is agitated and then allowed to decant. After some time, the aqueous solution is acidified, and the crystals which form are separated off and taken up in boiling alcohol. A fraction (20%) remains insoluble. This is dicoumarol (M.P.=288° C.). The alcoholic mother liquors are concentrated to dryness and taken up in 80% acetic acid. The residue crystallises (M.P.=153° C.). Yield 42%.

*Example 2.—3-(2-p-Methoxybenzoyl)-Ethyl-4-Hydroxycoumarin $C_{19}H_{16}O_5$*

This product is novel.

(a) To 2.84 g. of β-piperidino-p-methoxypropiophenone hydrochloride is added 1.6 g. of 4-hydroxycoumarin, and the mixture is heated for 15 minutes at 180° C. On cooling, a little alcohol and a 5% sodium hydroxide solution are added, and then ethyl ether. After agitation and decantation, the aqueous solution is acidified. A resin forms, which is taken up with boiling acetic acid. A fraction remains insoluble; this is dicoumarol. The acetic mother liquors, when slightly concentrated, crystallise in the form of colourless needles. M.P.=173° C. Yield 30%.

(b) To 2.84 g. (0.01 mol) of β-piperidino-p-methoxypropiophenone hydrochloride is added 1.6 g. (0.01 mol.) of 4-hydroxycoumarin, and the whole is dissolved in 15 cc. of pyridine and heated at about 130° C. for 2 hours. After cooling, a dilute aqueous sodium hydroxide solution is added and the mixture is extracted with ether. The acidified aqueous solution leaves a solid, which is recrystallised from alcohol. M.P.=173° C. Yield 85%. No dicoumarol has formed in the course of the operation.

*Example 3.—3-(2-o-Nitrobenzoyl)-Ethyl-4-Hydroxycoumarin $C_{18}H_{13}O_6N$*

This substance is prepared from β-piperidino-o-nitropropiophenone hydrochloride and 4-hydroxycoumarin, dissolved in pyridine, by a procedure similar to the preceding one. M.P.=169° C. (recrystallised from acetic acid).

*Example 4.—3-(2-m-Nitrobenzoyl)-Ethyl-4-Hydroxycoumarin $C_{18}H_{13}O_6N$*

(a) From β-piperidino-m-nitropropiophenone hydrochloride and 4-hydroxycoumarin, M.P.=187–188° C. (recrystallised from acetic acid).

(b) This compound can also be prepared by condensation of 3-piperidinomethyl-4-hydroxycoumarin and m-nitroacetophenone. To 1 gramme-molecule of the first compound is added about 1.5 gramme-molecules of the second compound, and the mixture is heated at 160° C. for 10 minutes. To the brown solution obtained are added ethyl alcohol, 5% aqueous caustic soda solution and ether. The alkaline solution separated is acidified. The liquid formed is separated off, and then taken up in boiling alcohol. The insoluble fraction, which consists of dicoumarol, is separated off. The alcoholic solution is concentrated to dryness and then taken up in acetic acid. Yellow crystals form, which have a melting point of 187–188° C. However, the yield is very low, the product formed in the course of the condensation being for the greater part dicoumarol.

*Example 5.—3-(2β-Naphthoyl)-Ethyl-4-Hydroxycoumarin $C_{22}H_{16}O_4$*

From β-piperidino-β-propionaphthone hydrochloride and 4-hydroxycoumarin, M.P.=192° C. (recrystallised from acetic acid).

It is also possible to condense 3-bromomethyl-4-acetoxycoumarin and ethyl β-naphthoylacetate in the presence of sodium ethylate (M.P.=190° C.).

*Example 6.—3-(2-p-Chlorobenzoyl)-Ethyl-4-Hydroxycoumarin $C_{18}H_{13}O_4Cl$*

From β-piperidino-p-chloropropiophenone hydrochloride and 4-hydroxycoumarin. M.P.=216° C. (recrystallised from acetic acid).

*Example 7.—3-(2-p-Bromobenzoyl)-Ethyl-4-Hydroxycoumarin $C_{18}H_{13}O_4Br$*

From β-piperidino-p-bromopropiophenone hydrochloride and 4-hydroxycoumarin; M.P.=230° C. (recrystallised from acetic acid). This derivative has a sodium salt sparingly soluble in cold water, so that it can be purified.

*Example 8.—3-(2-p-Phenylbenzoyl)-Ethyl-4-Hydroxycoumarin $C_{24}H_{19}O_4$*

From β-(N-dimethylamino)-paraphenylpropiophenone hydrochloride and 4-hydroxycoumarin. M.P.=180° C. (recrystallised from acetic acid). The sodium salt is also sparingly soluble in cold water.

*Example 9.—3-(2-p-Methoxybenzoyl-2-Methyl)-Ethyl-4-Hydroxycoumarin $C_{20}H_{18}O_5$*

From α-methyl-β-piperidino-p-methoxypropiophenone hydrochloride and 4-hydroxycoumarin. M.P.=126° C. (recrystallised from aqueous alcohol).

*Example 10.—3-(2-p-Methylbenzoyl)-Ethyl-4-Hydroxycoumarin $C_{19}H_{16}O_4$*

0.01 mol of β-piperidino-p-methylpropiophenone hydrochloride, 0.01 mol of 4-hydroxycoumarin and 0.02 mol. of sodium ethylate are mixed in absolute alcohol and heated under reflux for 3 hours. On completion of the reaction, dilute sodium hydroxide is added and the product is extracted with ether. On acidification of the aqueous solution, a precipitate forms which is recrystallised from alcohol. M.P.=175° C. Yield 30%.

A part of the initial 4-hydroxycoumarin which has not reacted is recovered from the alcoholic mother liquors.

The same compound can be obtained by condensation of 3 - bromo - methyl - 4 - acetoxycoumarin with ethyl-p-methylbenzoyl acetate in the presence of sodium ethylate.

*Example 11.—3-(3,4-Dimethoxy-2-Benzoyl)-Ethyl-4-Hydroxycoumarin $C_{20}H_{18}O_6$*

By condensation of β-piperidino-3,4-dimethoxypropiophenone with 4-hydroxycoumarin in pyridine. M.P.=189° C. (recrystallised from ethyl alcohol).

I claim:
1. Process for the production of 4-hydroxycoumarin derivatives of the formula

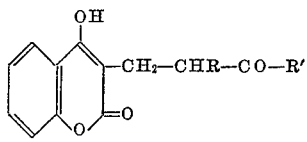

wherein R is a member of the class consisting of hydrogen and methyl, R' is a member of the class consisting of the phenyl radical, the diphenyl radical, the lower alkyl-, hydroxy-, lower alkyloxy-, di(lower alkyloxy)-, nitro- and halophenyl radicals, and the β-naphthyl radical, which consists in heating together 4-hydroxycoumarin and a Mannich base of an arylmethylketone of the formula

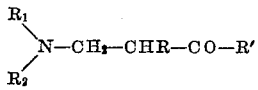

wherein $R_1$ and $R_2$ are members selected from the class consisting of independent hydrogen and lower alkyl, and lower alkyl so connected as to form with the adjacent nitrogen atom the piperidyl radical.

2. Process for the production of 4-hydroxycoumarin derivatives of the formula

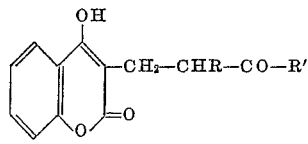

wherein R is a member of the class consisting of hydrogen and methyl, R' is a member of the class consisting of the phenyl radical, the diphenyl radical, the lower alkyl-, hydroxy-, lower alkyloxy-, di(lower alkyloxy)-, nitro- and halophenyl radicals, and the β-naphthyl radical, which consists in condensing within pyridine 3-bromomethyl-4-acetoxycoumarin with an alkylaroylacetate of the formula R'COCHRCOOR'', wherein R and R' have the same meaning as before, and R'' is lower alkyl.

3. Process according to claim 1, wherein the reaction is carried out in the presence of an alkali alcoholate.

4. Process according to claim 1, wherein the reaction is carried out in pyridine.

5. 3-(2-p-phenylbenzoyl)-ethyl-4-hydroxycoumarin.
6. 3-(2-p-chlorobenzoyl)-ethyl-4-hydroxycoumarin.
7. 3-(2-p-bromobenzoyl)-ethyl-4-hydroxycoumarin.
8. 3 -(3,4- dimethoxy -2- benzoyl)-ethyl -4- hydroxycoumarin.
9. 3-(2-p-methoxybenzoyl)-ethyl-4-hydroxycoumarin.
10. 3-(2-o-nitrobenzoyl)-ethyl-4-hydroxycoumarin.
11. 3-(2-m-nitrobenzoyl)-ethyl-4-hydroxycoumarin.
12. 3-(2β-naphthoyl)-ethyl-4-hydroxycoumarin.
13. 3-(2-p-methoxybenzoyl-2-methyl)-ethyl-4-hydroxycoumarin.
14. 3-(2-p-methylbenzoyl)-ethyl-4-hydroxycoumarin.

References Cited in the file of this patent
UNITED STATES PATENTS

| | | |
|---|---|---|
| 2,427,578 | Stahmann et al. | Sept. 16, 1947 |
| 2,648,682 | Stoll et al. | Aug. 11, 1953 |
| 2,789,986 | Prochazka | Apr. 23, 1957 |